Oct. 17, 1933.   W. T. GORMAN   1,930,894
VALVE SPRING SEAT AND RETAINER
Filed March 7, 1932
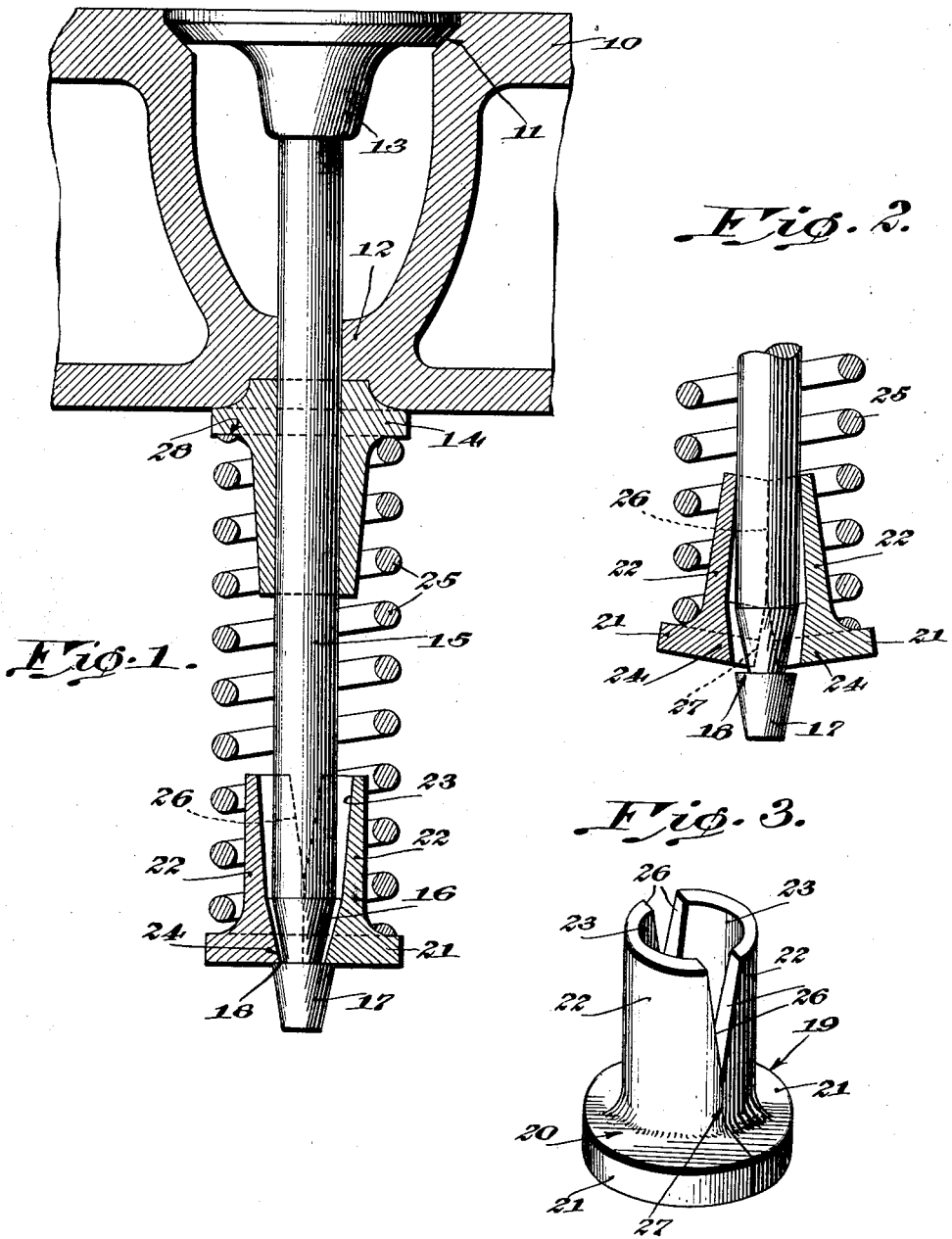
WITNESS
INVENTOR
W. T. Gorman,
BY
ATTORNEY Patented Oct. 17, 1933

1,930,894

UNITED STATES PATENT OFFICE 1,930,894

VALVE SPRING SEAT AND RETAINER

William Thomas Gorman, Pittsburgh, Pa.

Application March 7, 1932. Serial No. 597,356

1 Claim. (Cl. 251—144)

My invention relates to valve spring seats and retainers and it consists in the constructions, arrangements and combinations herein described and claimed.

As is well understood in the art, valves of internal combustion motors are retained upon their seats by the use of a helical spring secured to the valve stem of the valve, employing a washer and key for retention of the spring upon the valve stem, and as the valve structure is necessarily of small dimensions, considerable difficulty has been encountered in dismantling and assembling the valves, springs and keys for grinding of the valves and valve seats, with numerous losses of the keys by dropping into the crank case of the engine.

It is therefore a purpose of my invention to provide an improved key and valve seat which is of simple construction and readily applied to a valve stem without the use of special tools.

It is a further object of the invention to provide a valve spring retainer and washer which will afford proper suspension of the valve with respect to its seat so as to effect an efficient seating thereof.

It is a further object of the invention to provide a retainer which will automatically secure itself to the valve stem under tension of the valve spring, thus eliminating the necessity of manually securing the valve and spring by means of pins and the like.

Additional objects, advantages and features of invention will be apparent from the following description and accompanying drawing wherein, Figure 1 is a fragmentary sectional view of an engine having my invention applied to the stem of a valve thereof;

Fig. 2 is a detail view of my retainer applied to a valve stem in open position;

Fig. 3 is a perspective view of the retainer.

Reference is now made to Fig. 1 of the drawing, wherein I have shown generally a portion of an internal combustion motor 10, having a valve seat 11 and guide 12, through which a poppet valve 13 is reciprocably mounted, in the customary manner.

The engine 10 ordinarily embodies an upper valve stem guide 14 aligned with the guide 12 and serves as an additional guide means for the stem 15 of the valve 13.

Adjacent the lower end of the valve stem 15, the metal of the stem is cut away defining a cylindrical tapered portion 16, the stem finally terminating in a head 17. It should be noted that the tapered portion 16 is of less diameter than the head 17, thereby forming shoulders 18.

My combined valve spring retainer and washer is generally indicated at 19, and it consists of a pair of key members 20 of identical construction. Each key member has a semi-circular base member 21 and an upstanding semi-circular collar 22. The collars 22 have semi-circular recesses 23, which as clearly shown in Fig. 1 taper inwardly forming a heel as at 24, this taper being substantially the same as the degree of taper 16 of the valve stem, so that the keys will properly seat upon the shoulder 18. The base members 21 are of a diameter considerably greater than the collars 22 and define seats for a helical spring 24, as will be more fully described hereinafter.

In assembled position, the keys 20 are arranged with their recesses 23 in opposed relation, as clearly shown in Fig. 3 with their base members 21 in the same plane, thereby forming a contiguous disk or washer.

The collars 22 at their abutting edges are tapered as at 26, this taper extending from the tops of the collars toward the base members 21. The taper of the collars stops short of the base members, to define abutting shoulders 27. Thus there is provided a V-shaped opening at the upper ends of the collars, which will permit the key members 20 to be rocked upon the shoulders 27 to an open position as shown in Fig. 2, for release of an engaged valve stem.

In applying my seat and retainer upon a valve stem of an engine, the valve 13 is positioned upon its seat with the stem 15 projecting through the guides 12 and 14. The spring 25 is positioned around the stem 15 one end thereof engaging the seat 28 of the guide 14. The sectional key 20 is next moved into position upon the stem 15, the collars 22 being extended upwardly within the spring. With the key in this position, the valve is held against upward movement, and the key may then be forced upwardly against the tension of the spring until the tapered portion 24 engages with the shoulders 18 of the stem. Upon release of the key, the spring will exert a downward pressure upon the base members 21 insuring positive seating of the key upon the shoulders of the valve stem.

In order to release the key from engagement with the stem, any suitable tool may be employed to relieve the downward tension of the spring, and it is then only necessary to swing the upper portions of the collars 22 so as to bring the edges 26 into contacting relation as shown in Fig. 2, this swinging action taking place upon the shoulders 27. With the key in this position, it will be obvious that first one section of the key is removed and then the other, thus completely detaching the valve stem from the spring.

While I have shown and described a preferred construction, it should be understood that I do not confine myself to the exact construction shown and described and reserve as my own all such modifications as fairly fall within the scope of the appended claim.

I claim:

A valve spring seat and retainer comprising a valve stem having a portion thereof tapered to define a shoulder, a key formed of a pair of semi-cylindrical sections, each section having a semi-circular laterally projecting flange at the lower portion thereof, a helical spring receiving the semi-cylindrical portions of the key and having the lower end resting on the flanges, the lower inner faces of the sections being beveled to conform to the tapered portion of the stem, the underface of the flange adapted to rest upon the shoulder, the sections having vertical edges in normal contact for a portion of the length of said sections, the remaining portions of the edges being inclined away from each other to provide a V-shaped space between said portions so that the inclined portions may be moved toward each other to rock the flanges outwardly from supporting relation with the spring.

WILLIAM THOMAS GORMAN.